United States Patent
Yamazaki

(10) Patent No.: US 8,855,872 B2
(45) Date of Patent: Oct. 7, 2014

(54) CONSTRUCTION MACHINE

(75) Inventor: Yoichiro Yamazaki, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 45 days.

(21) Appl. No.: 13/820,541

(22) PCT Filed: Sep. 6, 2011

(86) PCT No.: PCT/JP2011/004995
§ 371 (c)(1),
(2), (4) Date: Mar. 4, 2013

(87) PCT Pub. No.: WO2012/039100
PCT Pub. Date: Mar. 29, 2012

(65) Prior Publication Data
US 2013/0164109 A1   Jun. 27, 2013

(30) Foreign Application Priority Data

Sep. 24, 2010  (JP) ................ 2010-213370

(51) Int. Cl.
*E02F 9/12* (2006.01)
*B60W 30/18* (2012.01)
(Continued)

(52) U.S. Cl.
CPC .......... *B60W 30/18127* (2013.01); *B66C 23/86* (2013.01); *E02F 9/2075* (2013.01);
(Continued)
USPC .......................... 701/50; 701/36; 180/333; 180/334; 180/65.265; 180/65.275; 414/744.2; 60/420; 60/706

(58) Field of Classification Search
CPC . B60W 30/18127; B60W 20/00; E02F 9/123; E02F 9/2095; E02F 9/2217; E02F 9/2091; E02F 9/2075; E02F 9/2058; H01M 10/46; H01M 16/00; H01M 2220/20; B66C 23/86; B60L 1/003; B60L 7/10; B60L 2200/40; Y02E 60/12
USPC ........................ 701/36, 50; 60/420, 698, 706; 414/744.2; 180/315, 333, 334, 65.21, 180/65.265, 65.275
See application file for complete search history.

(56) References Cited

U.S. PATENT DOCUMENTS

2006/0090462 A1 * 5/2006 Yoshino .................... 60/468
2009/0036264 A1 * 2/2009 Tozawa et al. ............. 477/5
(Continued)

FOREIGN PATENT DOCUMENTS

JP  2005 290882   10/2005
JP  2009 268222   11/2009
(Continued)

OTHER PUBLICATIONS

International Search Report Issued Dec. 13, 2011 in PCT/JP11/04995 Filed Sep. 6, 2011.

*Primary Examiner* — Russell Frejd
(74) *Attorney, Agent, or Firm* — Oblon, Spivak McClelland, Maier & Neustadt, L.L.P,

(57) ABSTRACT

A construction machine includes: a work device; an operation device which receives a manipulation; a hydraulic unit including a hydraulic motor; an electric unit including an electric motor and an energy storage unit; a control device which makes the electric power of the energy storage unit assist the hydraulic unit upon the manipulation for the drive side, and makes the electric motor generate regenerative electric power unit upon the manipulation for the regeneration side; and a power-discharge command unit which issues a discharge command for the energy storage unit. Upon receiving the discharge command, the control device operates the electric motor to lower a voltage of the energy storage unit upon the manipulation for the drive side, and makes only the hydraulic unit decelerate or stop the work device upon the manipulation for the regeneration side.

4 Claims, 5 Drawing Sheets

(51) Int. Cl.
  *B66C 23/86* (2006.01)
  *E02F 9/20* (2006.01)
  *E02F 9/22* (2006.01)
  *H01M 10/46* (2006.01)
  *B60L 1/00* (2006.01)
  *B60L 7/10* (2006.01)
  *B60W 20/00* (2006.01)
  *H01M 16/00* (2006.01)

(52) U.S. Cl.
  CPC .. *B60L 1/003* (2013.01); *B60L 7/10* (2013.01); *B60L 2200/40* (2013.01); *B60W 20/00* (2013.01); *E02F 9/123* (2013.01); *E02F 9/2091* (2013.01); *E02F 9/2095* (2013.01); *E02F 9/2217* (2013.01); *H01M 10/46* (2013.01); *H01M 2220/20* (2013.01); *Y02E 60/12* (2013.01); *H01M 16/00* (2013.01)

(56) References Cited

U.S. PATENT DOCUMENTS

2009/0077837 A1* 3/2009 Tozawa et al. .................. 37/361
2010/0270095 A1* 10/2010 Shono et al. ............... 180/65.29

FOREIGN PATENT DOCUMENTS

| JP | 2011 21432 | 2/2011 |
| JP | 2011 41357 | 2/2011 |

* cited by examiner

CONSTRUCTION MACHINE

TECHNICAL FIELD

The present invention relates to a construction machine, such as an excavator, which includes a combination of a hydraulic unit and an electric unit, as a drive unit for driving a work device.

BACKGROUND ART

The background art of the invention is described taking an example of an excavator shown in FIG. 4. The excavator is provided with a crawler-type lower propelling body 1, an upper slewing body 2 loaded on the lower propelling body 1 so as to be capable of being slewed around an axis O vertical to the ground, a working attachment 3 attached to the upper slewing body 2, and a slewing drive unit as shown in FIG. 5 for slewing the upper slewing body 2. The excavator has a combination of a hydraulic unit incorporated with a hydraulic motor as a drive source and an electric unit incorporated with an electric motor as a drive source, as the slewing drive unit (see patent literature 1).

FIG. 5 shows a part of the excavator, the part relating to the slewing drive. The lower propelling body 1 has a propelling frame 4, and the upper slewing body 2 has an upper frame 5 mounted on the propelling frame 4 through a slew bearing 6. The slew bearing 6 includes an inner ring 6a and an outer ring 6b which are rotatable relatively to each other. The inner ring 6a is fixed to the propelling frame 4, and the outer ring 6b is fixed to the upper frame 5. The slewing drive unit U drives the upper frame 5 to slew it around the axis O.

The slewing drive unit U is constituted of a hydraulic unit U1 and an electric unit U2. The hydraulic unit U1 includes a hydraulic motor 7 as a drive source, a speed reducer 8 for reducing the rotational force of the hydraulic motor 7, and a pinion gear 9 mounted on an output shaft of the speed reducer 8. The pinion gear 9 meshes with an internal gear (slewing gear) 10 fixed to the inner ring 6a of the slew bearing 6 to transmit the rotational force of the hydraulic motor 7 to the upper frame 5. The electric unit U2 includes an electric motor 11 as a drive source, a speed reducer 12 for reducing the rotational force of the electric motor 11, and a pinion gear 13 attached to an output shaft of the speed reducer 12. The pinion gear 13 meshes with the internal gear 10 at a position circumferentially different from the position of the pinion gear 9 of the hydraulic unit U1. The electric motor 11 of the electric unit U2 is designed: to assist the hydraulic unit U1 when the upper slewing body 2 is driven to be slewed, that is, when the upper slewing body 2 is applied with a torque in the same direction as the slewing direction, for instance, when the upper slewing body 2 is accelerated or when the upper slewing body 2 is upwardly slewed while the slewing speed thereof is maintained; and to act as a power generator when the slewing is braked to charge regenerated electric power into an energy storage unit.

FIG. 6 shows a hydraulic circuit and an electric circuit relating to the units U1 and U2. These circuits include a hydraulic pump 14 to be driven by an engine 15 to thereby discharging hydraulic fluid, a slewing remote control valve 16 with a lever to be manipulated, and a pilot-type control valve 17 to be operated by the slewing remote control valve 16. The hydraulic fluid discharged from the hydraulic pump 14 is supplied to the hydraulic motor 7 through the control valve 17, thereby rotating the hydraulic motor 7.

Specifically, upon the manipulation on the slewing remote control valve 16 clockwise or counterclockwise for speed acceleration, that is, upon the manipulation on the slewing remote control valve 16 to the slewing drive side, the hydraulic motor 7 is rotated at a speed corresponding to the operation amount of the lever to thereby drive the upper slewing body 2 to slew it. On the other hand, upon the manipulation on the slewing remote control valve 16 to the neutral position side, a hydraulic brake valve not graphically shown is actuated to stop or decelerate the upper slewing body 2 to thereby brake the slewing operation of the upper slewing body 2. Furthermore, the circuits have a relief valve not graphically shown and positioned on the discharge side of the hydraulic pump 14, the relief valve to let redundant fluid generated when the upper slewing body 2 is accelerated or decelerated to a tank.

The circuits further include pilot pressure sensors 18 and 19 which detect a pilot pressure Pa to be outputted from the slewing remote control valve 16 in correspondence to the operation amount of the lever; motor pressure sensors 20 and 21 which detect pressures $P_A$ and $P_B$ at both sides of the hydraulic motor 7 for obtaining a slewing operation pressure (the slewing operation pressure: $P_A$-$P_B$); a controller 22; an energy storage unit 23 including a battery (secondary battery) and a capacitor (electrical double layer capacitor); and an inverter 24. Each of the sensors 18 through 21 generates a detection signal and inputs the detection signal into the controller 22. The energy storage unit 23 supplies electric power as a power source for the electric motor 11 thereto. The inverter 24 constitutes a control device in cooperation with the controller 22 to control a slew acceleration torque, a slew deceleration torque, and the like.

In the above circuits, the controller 22 performs: judging presence or absence of manipulation on the lever of the remote control valve 16 based on signals from the pilot pressure sensors 18 and 19; calculating a slewing direction, a slewing speed, a required acceleration torque or a required deceleration torque based on a slew operation pressure corresponding to a difference between the pilot pressures; determining whether the upper slewing body 2 is accelerated, fixed, or decelerated, and the controller 25 inputs a control signal into the inverter 24 based on a result of the determination. The inverter 24 issues a command to the electric motor 11 based on the control signal. Specifically, in the case where the required acceleration torque is greater than a predetermined set value, inputted to the electric motor 11 is a command for producing an acceleration torque for assisting the slewing operation. In the case where the slewing speed has reached a constant speed or a predetermined set speed, or in the case where the required acceleration torque is equal to or smaller than the predetermined set value, inputted to the electric motor 11 is a command for stopping the output of the acceleration torque and functioning as a power generator while being rotated by inertia force. Also upon the deceleration in or stopping of the slewing, a similar regeneration command is inputted. The electric motor 11 supplies the regenerated electric power to the energy storage unit 23 as charging electric power, in other words, charges the energy storage unit 23.

In the excavator, where the hydraulic unit U1 is assisted by the electric unit U2, it is possible to generate a necessary and sufficient torque by adjusting the part of torque to be assisted by the electric unit U2, while securing a maximum required torque as a whole. This produces advantage in the aspect of energy saving and prevention of hunting due to an excessive torque.

This type of construction machine, however, has the following drawbacks to be overcome. Since the electric unit U2 is required to output a high power, there should be used, as the energy storage unit 23 which is a power source for the electric unit U2, one having a relatively high value (several hundred voltages) of voltage between terminals. Hence, when the energy storage unit 23 is directly handled, i.e., at a non-ordinary work time, such as at the time of replacing the energy storage unit 23 or disposing the energy storage unit 23, the energy storage unit 23 is required to be discharged enough to lower the voltage between the terminals to a safe value, specifically, to a zero level or to a safe low voltage value, in order to secure the safety of workers.

As a technology relating to the above point, patent literature 2 discloses a hybrid construction machine having a generator motor which functions as a load (power generator) based on a discharging command to discharge the electric power from an energy storage unit. Similarly to this, it is possible, in the circuit shown in FIGS. 5 and 6, to discharge the energy storage unit 23 by electrically connecting it to the electric motor 11 so as to actually cause a slewing operation; however, because regenerative action occurs upon stopping the slewing operation, it is necessary to consume the electric power as heat by providing a resistor in a circuit for controlling the electric motor in order to prevent regenerative electric power of the electric motor from being accumulated in the energy storage unit 23. Furthermore, in the case of great heat resistance, cooling is required. These factors obstruct reduction in the cost and reduction in the facility space.

Patent Literature 1: JP 2005-290882A
Patent Literature 2: JP 2009-268222A

SUMMARY OF INVENTION

An object of the invention is to provide a construction machine comprising a work device and a drive unit for moving the work device, wherein the drive unit includes a hydraulic unit and an electric unit and the electric unit includes an energy storage unit, the construction machine being capable of efficiently lowering a voltage between terminals of the energy storage unit while not involving an intolerable increase in the cost and in the facility space.

The construction machine to be provided by the invention comprises: a work device operable on a drive side and on a regeneration side; an operation device which receives a manipulation and outputs an operation command concerning the work device in accordance with the manipulation; a hydraulic unit which includes a hydraulic motor as a drive source and drives the work device based on the manipulation on the operation device; an electric unit which includes an electric motor as a drive source and an energy storage unit functioning as a power source for the electric motor, the electric unit being configured to assist driving of the work device by the hydraulic unit; a control device which operates the electric unit in such a manner that the electric motor assists the hydraulic unit by electric power from the energy storage unit when the operation device receives a manipulation for actuating the work device on the drive side and which operates the electric unit in such a manner that the electric motor generates regenerative electric power to supply the regenerative electric power to the energy storage unit as charging electric power when the operation device receives a manipulation for actuating the work device on the regeneration side; and a power-discharge command unit which issues a power discharge command to the energy storage unit. The control device operates the electric motor to lower a voltage between terminals of the energy storage unit when the operation device receives the manipulation for the drive side and makes only the hydraulic unit to decelerate or stop the working device while not allowing the electric unit to generate the regenerative electric power when the operation device receives the manipulation for the regeneration side, in the case where the power-discharge command unit issues the power discharge command.

DESCRIPTION OF EMBODIMENTS

In the following, a first embodiment of the invention is described referring to FIG. 1 and FIG. 2.

Figure 4:
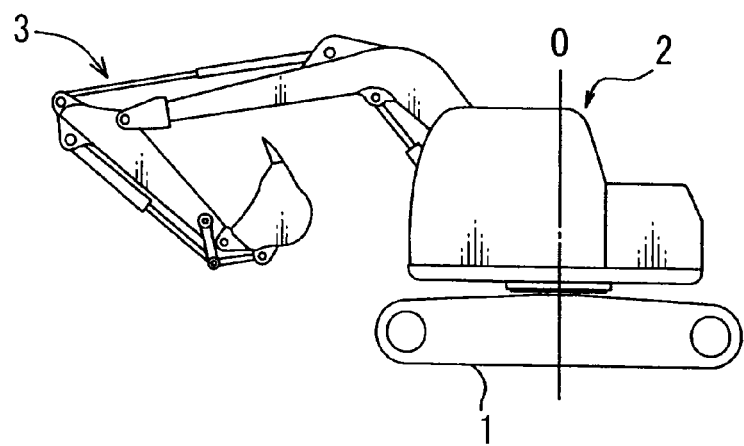
FIG. 4 is a schematic side view of an excavator as an example to which the invention is applied.
Figure 5:
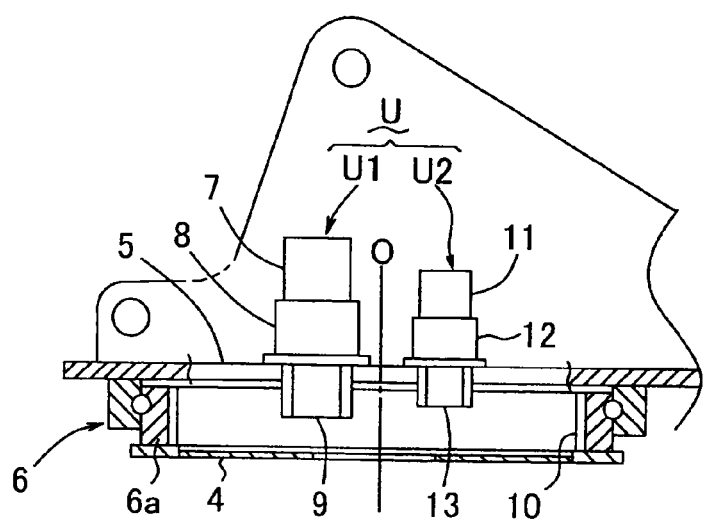
FIG. 5 is a partially sectional side view showing a slewing drive portion of an excavator in which a hydraulic unit and an electric unit is used as a slewing drive unit.
Figure 6:
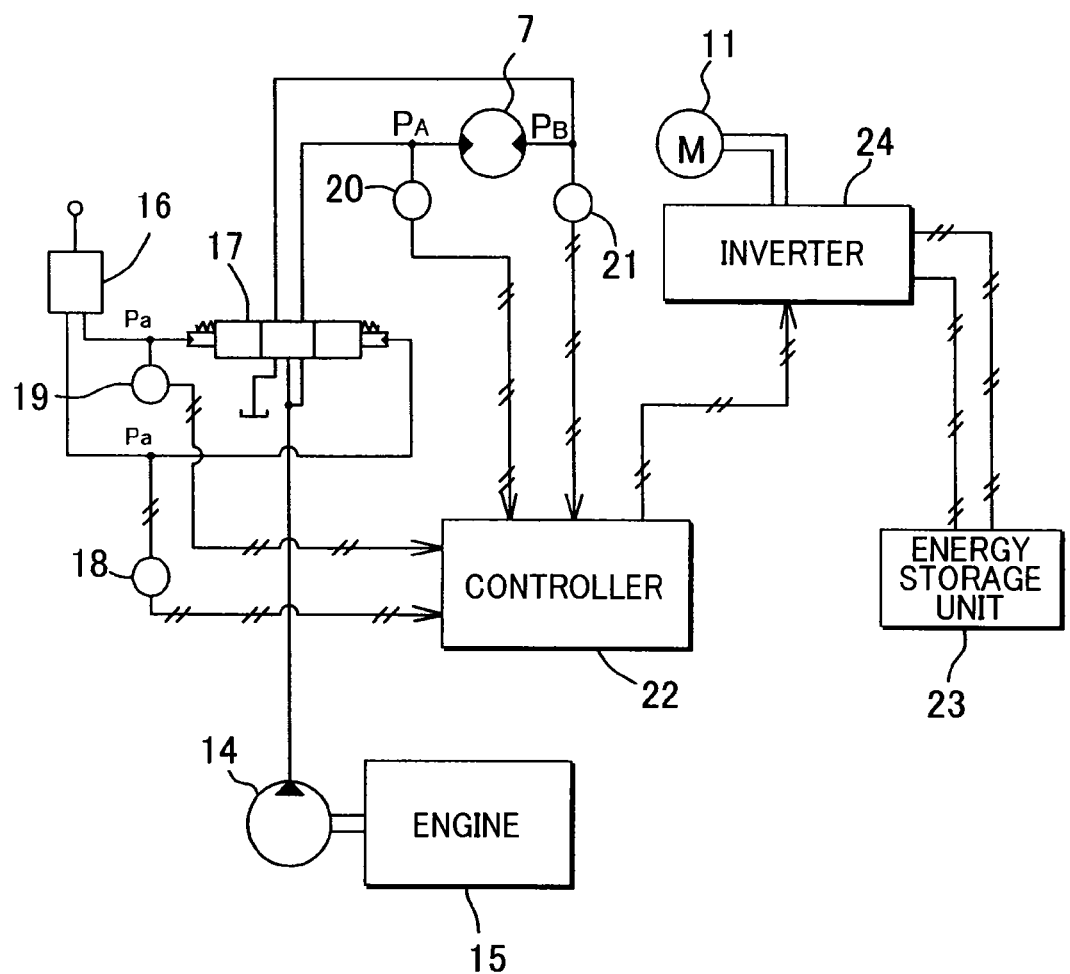
FIG. 6 is a diagram showing an example of a conventional circuit relating to drive for slewing.

This embodiment is an example of applying the invention to the excavator shown in FIG. 4 and FIG. 5. Specifically, the excavator according to the embodiment comprises a crawler-type lower propelling body 1, an upper slewing body 2 loaded on the lower propelling body 1 so as to be capable of being slewed around an axis O vertical to the ground, a working attachment 3 attached to the upper slewing body 2, and a slewing drive unit as shown in FIG. 5 for slewing the upper slewing body 2, the slewing drive unit including a hydraulic unit with a hydraulic motor as a drive source and an electric unit with an electric motor as a drive source. The lower propelling body 1 has a propelling frame 4, and the upper slewing body 2 has an upper frame 5 which is mounted on the propelling frame 4 through a slew bearing 6. The slew bearing 6 has an inner ring 6a and an outer ring 6b relatively rotatable to each other. The inner ring 6a is fixed to the propelling frame 4, and the outer ring 6b is fixed to the upper frame 5. The slewing drive unit U drives the upper frame 5 to slew it around the axis O. The slewing drive unit U is constituted of a hydraulic unit U1 and an electric unit U2. The hydraulic unit U1 includes a hydraulic motor 7 as a drive source, a speed reducer 8 for reducing the rotational force of the hydraulic motor 7, and a pinion gear 9 mounted on an output shaft of the speed reducer 8. The pinion gear 9 meshes with an internal gear (slewing gear) 10 fixed to the inner ring 6a of the slew bearing 6 to transmitting the rotational force of the hydraulic motor 7 to the upper frame 5 as a slew driving force. The electric unit U2 includes an electric motor 11 as a drive source, a speed reducer 12 for reducing the rotational force of the electric motor 11, and a pinion gear 13 mounted on an output shaft of the speed reducer 12. The pinion gear 13 meshes with the internal gear 10 at a position circumferentially different from the position of the pinion gear 9 of the hydraulic unit U1. The electric motor 11 of the electric unit U2 is adapted to assist the hydraulic unit U1 when the upper slewing body 2 is driven to be slewed, that is, when the upper slewing body 2 is applied with a torque in the same direction as the slewing direction, for instance, when the upper slewing body 2 is accelerated or when the upper slewing body 2 is upwardly slewed while the slewing speed thereof is maintained, and is adapted to act as a power generator, when the slewing is braked, to charge regenerated electric power into an energy storage unit.

Figure 1:
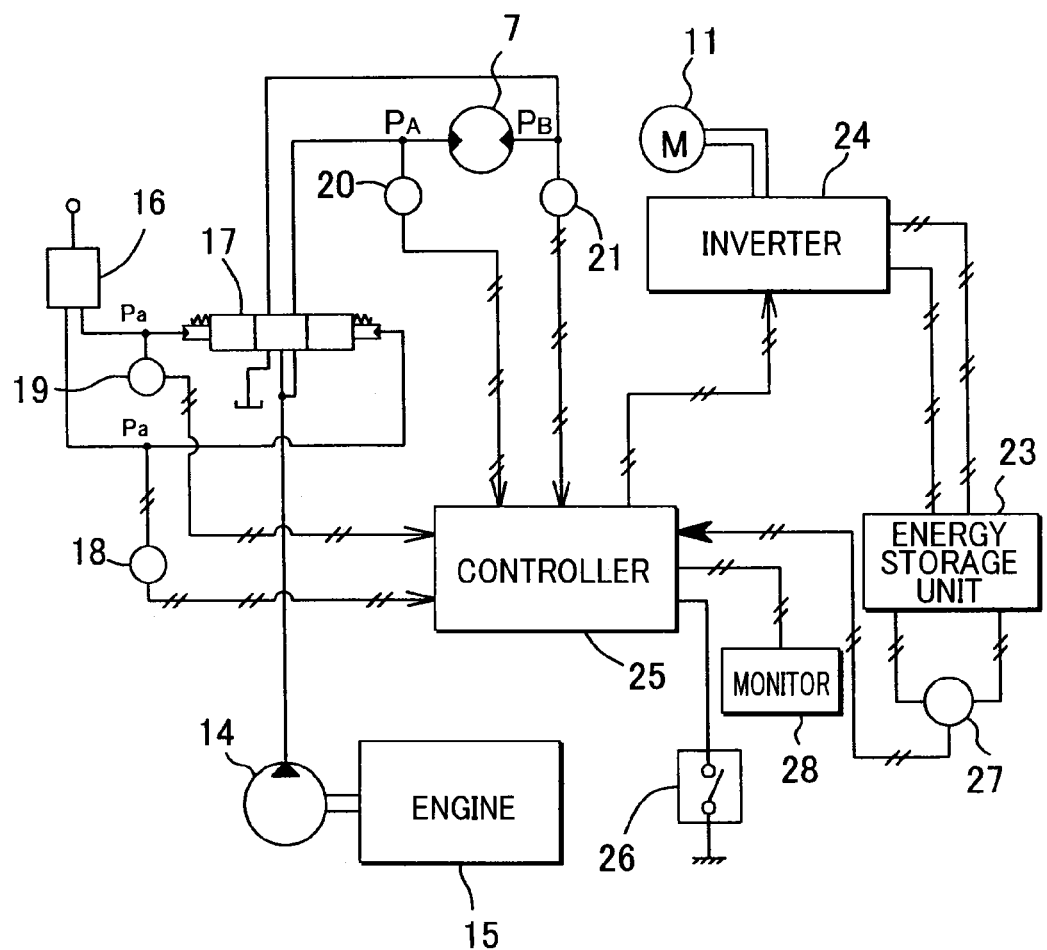
FIG. 1 is a diagram showing a circuit to be loaded in an excavator according to a first embodiment of the invention.

FIG. 1 shows a circuit relating to slewing drive in the excavator according to the embodiment. This circuit includes a hydraulic pump 14 which discharges hydraulic fluid when being driven by an engine 15, a slewing remote control valve 16 including a lever to be manipulated, and a pilot-type control valve 17 to be operated by the slewing remote control valve 16. The hydraulic fluid discharged from the hydraulic pump 14 is supplied to the hydraulic motor 7 via the control valve 17, thereby rotating the hydraulic motor 7. Specifically, upon clockwise or counterclockwise manipulation on the slewing remote control valve 16 for speed acceleration, that is, upon manipulation on a side for slewing drive, the hydraulic motor 7 is rotated at a speed corresponding to the operation amount of the lever to drive the upper slewing body 2 to slew it. On the other hand, in response to the manipulation on the slewing remote control valve 16 to the neutral position side, an unillustrated hydraulic brake valve for use in stopping or decelerating the upper slewing body 2 is actuated to brake the slewing of the upper slewing body 2. Furthermore, this circuit includes an unillustrated relief valve positioned on the discharge side of the hydraulic pump 14, the relief valve being configured to let redundant hydraulic fluid at the time of accelerating the upper slewing body 2 and at the time of decelerating the upper slewing body 2 to a tank.

The circuit further includes: pilot pressure sensors 18 and 19 each of which detects a pilot pressure Pa outputted from the slewing remote control valve 16 in correspondence to the operation amount of the lever; motor pressure sensors 20 and 21 which detect respective side pressures $P_A$ and $P_B$ on both sides of the hydraulic motor 7 for obtaining a slew operation pressure (the slew operation pressure: $P_A-P_B$); a controller 25; an energy storage unit 23 including a battery (secondary battery) and a capacitor (electrical double layer capacitor); and an inverter 24. Each of the sensors 18 through 21 generates a detection signal and inputs the detection signal to the controller 25. The energy storage unit 23 supplies electric power to the electric motor 11, as a power source for the electric motor 11. The inverter 24 constitutes a control device in cooperation with the controller 25, and controls a slew acceleration torque, a slew deceleration torque, and the like.

In the above circuit, the controller 25 makes judgment on presence or absence of manipulation on the lever of the remote control valve 16 based on signals from the pilot pressure sensors 18 and 19, calculation of a slewing direction, a slewing speed, a required acceleration torque or a required deceleration torque based on a slew operation pressure corresponding to a difference between the pilot pressures, and determination on whether the upper slewing body 2 is to be accelerated, fixed, or decelerated: based on a result thereof, the controller 25 outputs a control signal to the inverter 24. The inverter 24 issues a command to the electric motor 11 based on the control signal. Specifically, in the case where a required acceleration torque is over a predetermined set value, there is inputted to the electric motor 11 a first command for causing the electric motor 11 to generate an acceleration torque for assisting the slewing operation. In the case where the slewing speed has reached a constant speed or a predetermined set speed, or in the case where the required acceleration torque is equal to or smaller than the predetermined set value, there is inputted to the electric motor 11 a second command for causing the electric motor 11 to stop output of the acceleration torque operate and operate as a power generator while being rotated by inertia force. Also upon deceleration in the upper slewing body 2 and stop of the upper slewing body 2, a similar regeneration command is inputted. The electric motor 11 supplies the regenerative electric power thereof to the energy storage unit 23 as charging electric power, in other words, charges the energy storage unit 23.

The circuit further includes a discharging switch 26 as a power-discharge command unit. The discharging switch 26 outputs a discharge command signal to the controller 25 when being manipulated to ON by an operator, the discharge command being inputted to the controller 25. The circuit further includes a voltage detector 27 for detecting a voltage between terminals of the energy storage unit 23 and a monitor 28 connected to the controller 25. The monitor 28 provides, based on a display signal inputted from the controller 25, an indication about the voltage between the terminals detected by the voltage detector 27 and a message that the detected voltage has dropped to a safe value. The monitor 28 may provide the above indication only by way of an image, or may provide by way of both of an image and sound. Alternatively, in place of the monitor 28, it is also possible to use an indication device which provides the indication only by way of sound.

The controller 25 performs different controls of the electric motor 11 at a time of an ordinary operation when the discharging switch 26 outputs no discharging command signal and at a time of discharge operation when the discharging switch 26 outputs the discharging command, respectively. FIG. 2 shows an operation of the controls.

Firstly, in Step S1, the controller 25 judges whether the discharging switch 26 is turned on, in other words, whether a discharging command is outputted. In the case of judging NO in Step S1, in other words, in the case of judging that no discharging command is outputted, the control operation directly proceeds to Step S2. In the case of judging YES in Step S1, in other words, in the case of judging that a discharging command is outputted, the controller makes the monitor 28 indicate a voltage between the terminals of the energy storage unit 23 at the point of time when the discharging command is outputted in Step S3, and thereafter the control operation proceeds to Step S2.

The controller 25 judges whether there is a manipulation on the lever of the remote control valve 16 in Step S2. In the case of judging NO in Step S2, in other words, in the case of judging that the lever is not manipulated, the control operation returns to Step S1, because of no need for control. The control operation returns to Step S4 only in the case of judging YES in Step S2, in other words, in the case of judging that the lever is manipulated.

In Step S4, the controller 25 judges whether the manipulation on the lever is one made for the drive side, i.e., one for driving the upper slewing body 2 in a slewing direction, or one made for a regeneration side, i.e., for decelerating or stopping the upper slewing body 2. In the case of judging that the manipulation is one made for the drive side, the controller 25 calculates an assist power by the electric unit in Step S5 and inputs an electric assist command based on the calculated assist power to the inverter 24 in Step S6. Specifically, in Step S5, the controller 25 determines a required acceleration torque based on an operation amount of the lever, a slew operation pressure, and a slewing speed, and, in the case where the required acceleration torque is over a predetermined set value, the controller 25 issues a command for causing the electric motor 11 to generate an acceleration torque, in Step S6, because of requirement of slewing assist by the electric motor 11. In this case, the acceleration torque which the electric motor 11 should generate is set to an acceleration torque having such a magnitude that the acceleration torque can be obtained even with no relief in the hydraulic circuit, or even with a short relief time. This causes the electric motor 11 to start assisting the slewing drive, and the control operation returns to Step S1.

On the other hand, in the case of judging, in Step S4, that the manipulation is one made on a side for regeneration, the controller 25 renews judgment whether the discharging switch 26 is turned on in Step S7. In the case of judging NO in Step S7, the controller 25 performs regeneration control for a time of the ordinary operation, that is, a calculation of regenerative electric power of the electric unit in Step S8 and output of a regeneration command based on the calculated regenerative electric power in Step S9, and thereafter the control operation returns to Step S1. This causes the regenerative electric power generated in the electric motor 11 to be supplied to the energy storage unit 23 as charging electric power, and the energy storage unit 23 is charged. In the case of judging YES in Step S7, in other words, in the case of judging that the discharging switch 26 is turned on and a discharging command is outputted, the control operation returns to Step S1, with no calculation of regenerative electric power in Step S8 and no output of a regeneration command in Step S9 by the controller 25.

In summary, during a slewing operation after the issue of a discharging command, the controller 25 operates the electric motor 11 on a side for drive side to make the electric power accumulated by the electric motor 11 be discharged to thereby lower the voltage of the terminals of the energy storage unit 23, when the slewing drive should be performed, i.e., when a slewing torque should be exerted in the same direction as the slewing direction of the upper slewing body 2, and thereafter, when the decelerating and stopping the slewing of the upper slewing body 2, the controller 25 does not allow the electric motor 11 to generate the regenerative electric power and perform a braking operation only by the hydraulic motor 7 in the hydraulic unit (specifically, returns the control valve 17 to a neutral position thereof to cause a braking pressure), so as not to allow the electric motor 11 to perform regenerative action. Thus, the discharge from the energy storage unit 23 is allowed while regeneration is not allowed, so that regenerative electric power is permitted not to be generated. This eliminates need for consuming regenerative electric power by a resistor as heat, thus enabling an additional facility such as a resistor and a cooling device for absorbing resistance heat to be unnecessary or simplified, and thereby contributing to reduced cost and reduced facility space. In particular, in the case of applying the invention to a slewing drive system as described in the embodiment, where high regeneration energy can be generated and consuming such regeneration energy as heat may requires a large-scale facility, generating no regeneration energy is practically beneficial in the aspect of reducing the cost and reducing the space.

The monitor 28 constantly indicates a voltage between terminals of the energy storage unit 23 to an operator, after the issue of the discharge command. Accordingly, the operator is allowed to release the discharging command at a point of time when the voltage has dropped to a safe value as a result of repeating the operation on the drive side and the operation on the regeneration side after a discharge is commanded, and then is allowed to replace or dispose the energy storage unit 23.

Figure 3:
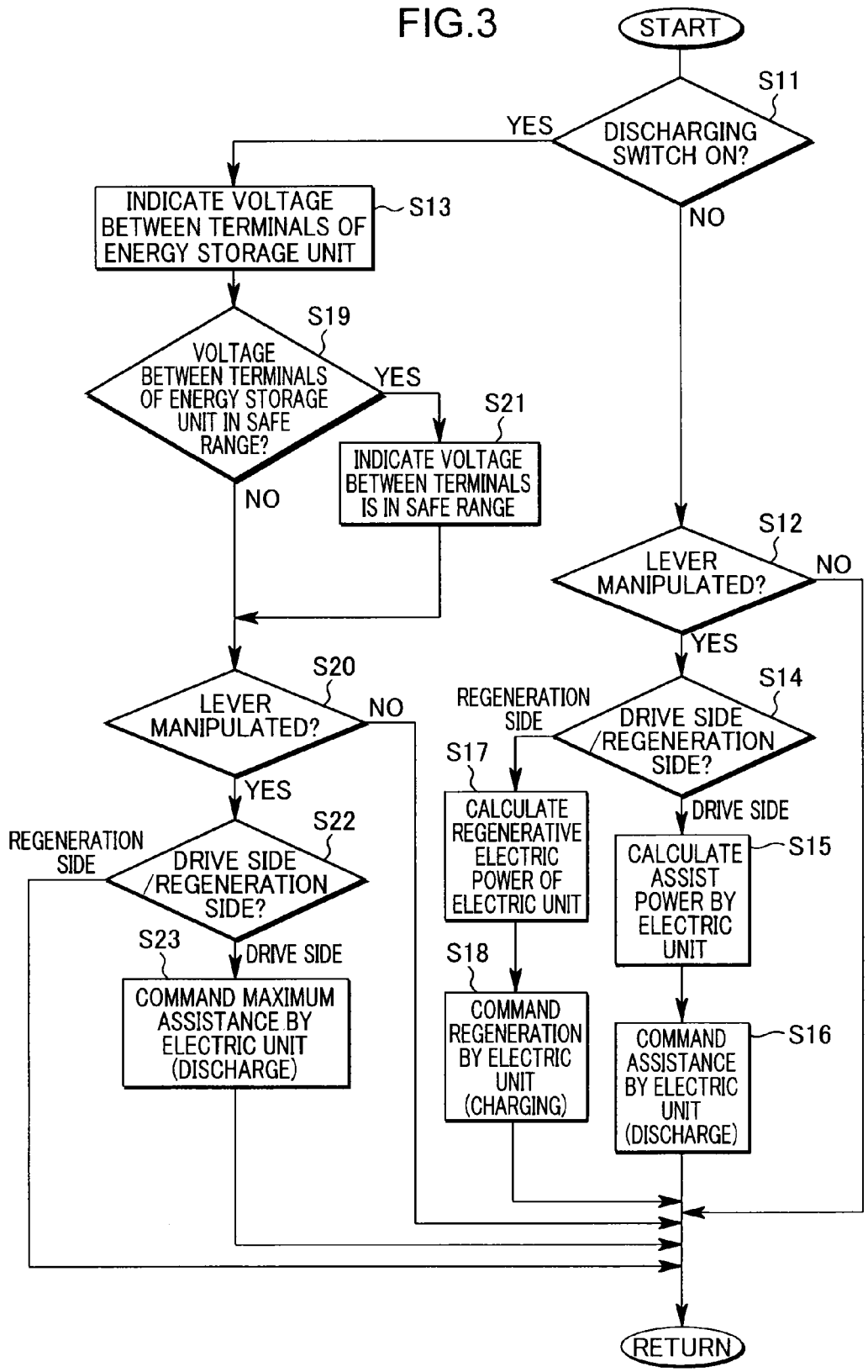
FIG. 3 is a flowchart showing a control operation performed in an excavator according to a second embodiment of the invention.

A second embodiment of the invention is described referring to FIG. 3. The circuit provided in a construction machine according to the second embodiment is substantially equivalent to the circuit described in the first embodiment. In other words, the second embodiment is also configured based on the circuit shown in FIG. 1. However, the control operation to be performed in the second embodiment is different from that in the first embodiment, as shown in FIG. 3. Specifically, the second embodiment is different from the first embodiment in the electric assist in actuating the upper slewing body 2 on the drive side after the issue of a discharge command and the indication provided by the monitor 28.

Figure 2:
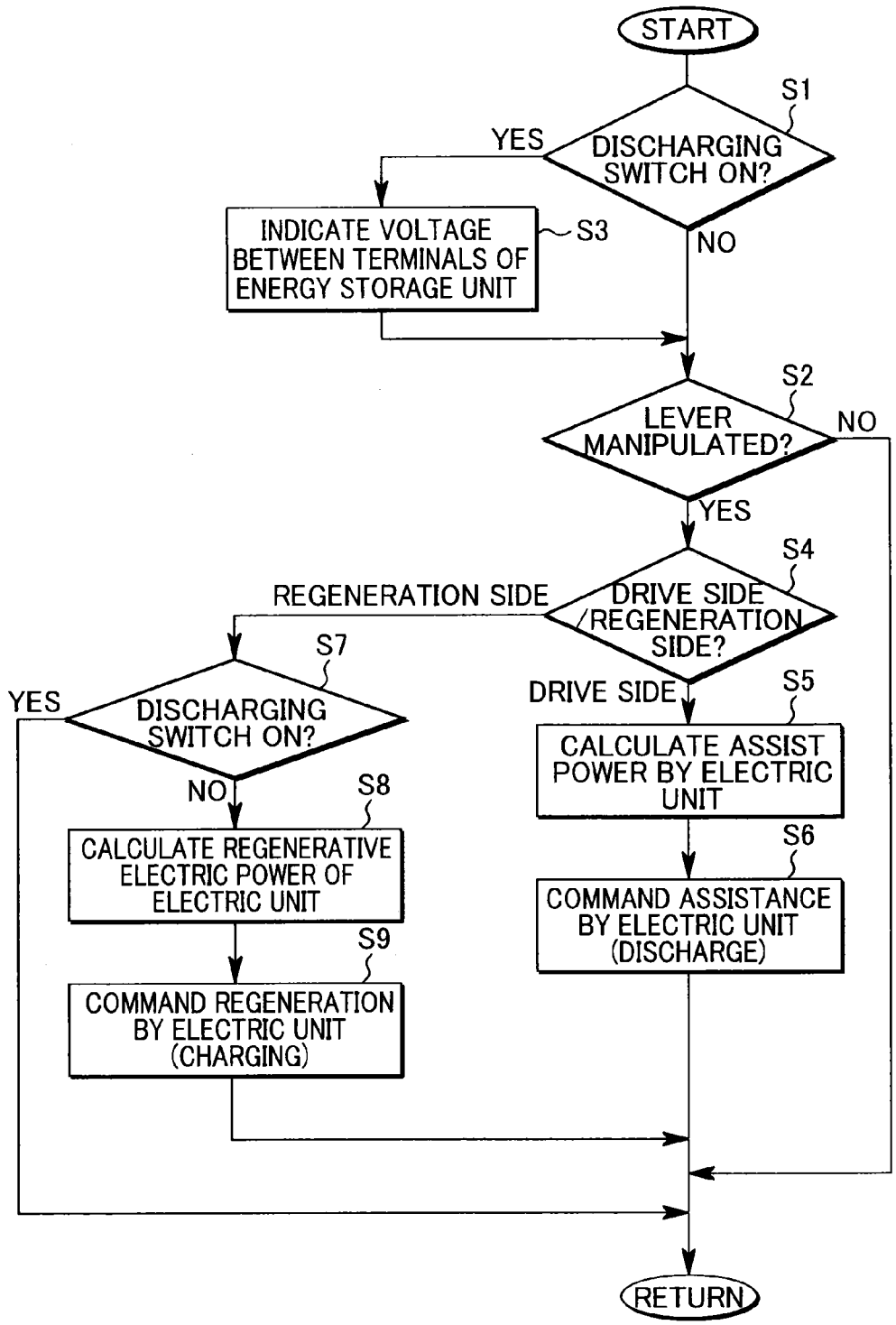
FIG. 2 is a flowchart showing a control operation performed in the excavator.

In the flowchart shown in FIG. 3, Steps S11 through S16 are substantially equal to Steps S1 through S6 shown in FIG. 2; however, in the case of judging that a discharging switch 26 is turned off (NO in Step S11) and that the type of operation in Step S14 is "REGENERATION", the controller 25 calculates regenerative electric power by an electric unit in Step S17 and issues a regeneration command to the electric unit in Step S18.

On the other hand, in the case of judging that the discharging switch 26 is turned on (YES in Step S11), the controller 25 causes the monitor 28 to indicate a voltage between terminals of an energy storage unit in Step S13 and determines whether the voltage of the energy storage unit has dropped to a predetermined safe level, specifically, to a zero level or a safe low voltage, in Step S19. In the case of judging NO in Step S19, the control operation directly proceeds to Step S20. In the case of judging YES in Step S19, the controller 25 causes the monitor 28 to provide an indication thereon, e.g., the indication "ENERGY STORAGE UNIT SAFELY DISMOUNTABLE", in Step S21, and thereafter the control operation proceeds to Step S20. The controller 25 judges whether the lever of the slewing remote control valve 16 is manipulated, in Step S20, and further judges whether the manipulation is an operation on a side for the drive side or the regeneration side, in Step S22. In the case of judging that the manipulation is for the regeneration side, the control operation returns to Step S11 while not allowing the electric motor 11 to perform a regeneration operation similarly to the control operation which returns from Step S7 to Step S1 in FIG. 2. Hence, no regenerative electric power is generated, similarly to the first embodiment.

On the other hand, in the case of judging that the manipulation is for the drive side in Step S22, the controller 25 commands an inverter 24 to cause the electric unit to output a maximum assist power, in Step S23. Specifically, the controller 25 causes the electric unit to assist a hydraulic unit at a maximum torque determined based on a rated electric power of the electric motor 11. This maximizes the electric power to be discharged by an energy storage unit 23 in the electric unit and minimizes the time required for lowering the voltage of the terminals of the energy storage unit 23 to a predetermined voltage. In this example, the maximum assist power may be set to such a value that the drive torque of the hydraulic unit becomes zero or a value close to zero; or may be set to a value substantially equivalent to or larger than a maximum assist power at a time of the ordinary operation, that is, at a time when no discharge command is issued.

The controller 25 according to the second embodiment causes the monitor 28 to indicate that the voltage of the terminals of the energy storage unit has dropped to a safe value, thereby, in comparison with a case of only an indication about a change in the voltage of the terminals merely by a change in the number, allowing an operator to clearly recognize that the voltage has dropped to a safe value and the operator is permitted to finish the operation for discharging. This results in securing higher safety and improvement of working efficiency.

The construction machine according to the invention is not limited to an excavator. The invention is widely applicable to any working machine provided with a lower propelling body and an upper slewing body to be loaded thereon, as well as an excavator, for instance, to a demolishing machine or a crushing machine configured by use of a main body of an excavator as a main body. Furthermore, the work device to be driven is not limited to a slewing drive system as described above. The invention is also applicable to a drive system for other work device in which a regeneration operation is performed, e.g. to a drive system for a working attachment (particularly, a boom). In the above modification, an operation on the side where the boom is raised corresponds to an operation on the drive side, and an operation on the side where the boom is lowered corresponds to an operation on the regenerations side.

As described above, the invention provides a construction machine comprising a work device and a drive unit for moving the work device, wherein the drive unit includes a hydraulic unit and an electric unit and the electric unit includes an energy storage unit, the construction machine being capable of efficiently lowering a voltage between terminals of the energy storage unit while not involving an intolerable increase in the cost and in the facility space. The construction machine comprises: a work device operable on a drive side and on a regeneration side; an operation device which receives a manipulation and outputs an operation command concerning the work device in accordance with the manipulation; a hydraulic unit which includes a hydraulic motor as a drive source and drives the work device based on the manipulation on the operation device; an electric unit which includes an electric motor as a drive source and an energy storage unit functioning as a power source for the electric motor, the electric unit being configured to assist driving of the work device by the hydraulic unit; a control device which operates the electric unit in such a manner that the electric motor assists the hydraulic unit by electric power from the energy storage unit when the operation device receives a manipulation for actuating the work device on the drive side and which operates the electric unit in such a manner that the electric motor generates regenerative electric power to supply the regenerative electric power to the energy storage unit as charging electric power when the operation device receives a manipulation for actuating the work device on the regeneration side; and a power-discharge command unit which issues a power discharge command to the energy storage unit. The control device operates the electric motor to lower a voltage between terminals of the energy storage unit when the operation device receives the manipulation for the drive side and makes only the hydraulic unit to decelerate or stop the working device while not allowing the electric unit to generate the regenerative electric power when the operation device receives the manipulation for the regeneration side, in the case where the power-discharge command unit issues the power discharge command. Thus, the energy storage unit discharges but regeneration does not occur, when the operation device is manipulated on a side for the regeneration side, so that a resistor for consuming regenerative electric power as heat and a cooling device for absorbing the heat are not required, or permitted to be significantly simplified. Although decelerating and stopping the work device only by the hydraulic unit involves heat generation in the hydraulic unit, the generated heat can be outwardly released to the outside by a facility originally equipped in a hydraulic system e.g. by an oil cooler, thus allowing an additional facility be unnecessary.

It is preferable that, in the case where the power-discharge command unit issues the discharge command, the control device cause the electric motor to output a maximum assist power thereof when the operation device is operated on a side for the drive side. This enables the time required for the discharging operation to be minimized.

The construction machine according to the invention may further include, for example, a lower propelling body; the work device may be an upper slewing body loaded on the lower propelling body so as to be capable of being slewed; and the drive unit may be a slewing drive unit which drives the upper slewing body to slew it. In this case, it is preferable that the control device operates the electric motor to assist the hydraulic unit when the operation device is manipulated for the drive side, while causes the electric motor to generate the regenerative electric power when the operation device is manipulated for the regeneration side. Since the slewing of the upper slewing body involves generation of high regeneration energy, not allowing regenerative electric power to be generated when the discharge command is issued brings significantly large practical advantage of omitting a large-scale additional facility for heat consumption.

Preferably, the construction machine according to the invention may further include a voltage detector which detects the voltage between the terminals of the energy storage unit and an indicator, wherein the control device causes the indicator to indicate that the voltage between the terminals detected by the voltage detector has dropped to a predetermined safe value, when the detected voltage between the terminals has dropped to the predetermined safe value. Thus indicating that the voltage between the terminals of the energy storage unit has dropped to a safe value allows an operator to clearly recognize that the voltage has dropped to the safe value and that the operator is permitted to finish the operation for discharge, in comparison with a mere indication of a value of the voltage between the terminals. This results in securing higher safety and improvement of working efficiency.

The invention claimed is:

1. A construction machine, comprising:
   a work device operable on a drive side and on a regeneration side;
   an operation device which receives a manipulation and outputs an operation command concerning the work device in accordance with the manipulation;
   a hydraulic unit which includes a hydraulic motor as a drive source and drives the work device based on the manipulation on the operation device;
   an electric unit which includes an electric motor as a drive source and an energy storage unit functioning as a power source for the electric motor, the electric unit being configured to assist driving of the work device by the hydraulic unit;
   a control device which operates the electric unit in such a manner that the electric motor assists the hydraulic unit by electric power from the energy storage unit when the operation device receives a manipulation for actuating the work device on the drive side and which operates the electric unit in such a manner that the electric motor generates regenerative electric power to supply the regenerative electric power to the energy storage unit as charging electric power when the operation device receives a manipulation for actuating the work device on the regeneration side; and
   a power-discharge command unit which issues a power discharge command to the energy storage unit, wherein
   the control device, in the case where the power-discharge command unit issues the power discharge command, operates the electric motor to lower a voltage between terminals of the energy storage unit when the operation device receives the manipulation for the drive side, and makes only the hydraulic unit to decelerate or stop the working device while not allowing the electric unit to generate the regenerative electric power when the operation device receives the manipulation for the regeneration side.

2. The construction machine according to claim 1, wherein, in the case where the power-discharge command unit issues the discharge command, the control device causes the electric motor to output a maximum assist power thereof when the operation device is manipulated for the drive side.

3. The construction machine according to claim 1, further comprising a lower propelling body, wherein the work device is an upper slewing body loaded on the lower propelling body so as to be capable of being slewed, the drive unit is a slewing drive unit which drives the upper slewing body to slew the upper slewing body, and the control device operates the electric motor to assist the hydraulic unit when the operation device is manipulated for the drive side, and causes the electric motor to generate the regenerative electric power when the operation device is operated on the regeneration side.

4. The construction machine according to claim 1, further comprising a voltage detector which detects the voltage between the terminals of the energy storage unit and an indicator, wherein the control device causes the indicator to indicate that the voltage between the terminals detected by the voltage detector has dropped to a predetermined safe value, when the detected voltage between the terminals has dropped to the predetermined safe value.

\* \* \* \* \*